No. 653,530. Patented July 10, 1900.
C. T. RICHMOND.
VOLTAIC CELL.
(Application filed Oct. 9, 1897.)
(No Model.)
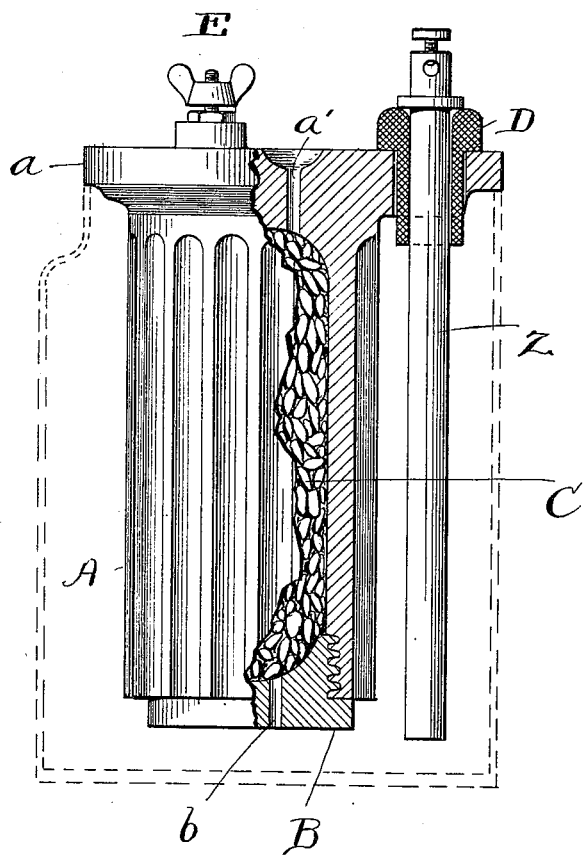
Witnesses
E. B. Gilchrist
Philip E. Knowlton
Inventor
Charles T. Richmond
By his Attorneys,
Thurston & Bates

UNITED STATES PATENT OFFICE.

CHARLES T. RICHMOND, OF CLEVELAND, OHIO, ASSIGNOR TO THE NATIONAL CARBON COMPANY, OF SAME PLACE.

VOLTAIC CELL.

SPECIFICATION forming part of Letters Patent No. 653,530, dated July 10, 1900.

Application filed October 9, 1897. Serial No. 654,715. (No model.)

*To all whom it may concern:*

Be it known that I, CHARLES T. RICHMOND, a citizen of the United States, residing at Cleveland, in the county of Cuyahoga and State of Ohio, have invented certain new and useful Improvements in Voltaic Cells; and I do hereby declare the following to be a full, clear, and exact description of the invention, such as will enable others skilled in the art to which it appertains to make and use the same.

The invention relates to the class of voltaic cells which have as one element a porous carbon cup, which is adapted to contain a depolarizing agent, such as manganese dioxid and powdered carbon.

The object of the invention is to provide for use in such a cell a porous carbon cup which may be cheaply made and is capable of being quickly cleaned and refilled with the depolarizing agent without injury to itself or any other part of the cell.

The invention resides wholly in the porous carbon cup and the means for closing the same; and it consists in the construction and combination of parts hereinafter described and claimed.

The drawing is an elevation, partly in section, of a porous carbon cup containing my invention and showing also the zinc element Z and in dotted lines the jar of the cell.

Referring to the parts by letters, A represents a porous carbon cup with the opening at the bottom. Its upper end is permanently closed, and at said end there is formed an external flange $a$. The opening to this cup, at the bottom thereof, is internally screw-threaded.

B represents a plug adapted to be screwed into the lower end of this cup after said cup has been filled with the depolarizing agent C. After having been thus filled and closed the cup is turned right side up, as shown, and inserted into the glass jar, the flange $a$ resting on the top edge of said jar in the usual manner.

The plug B may be made of any suitable material, which may be carbon, or it may be porcelain or any other material which will not be acted upon by the exciting solution. In the best construction a vent-hole $b$ is formed in the plug to permit the quick entry of the exciting solution into the interior of the cup. Another vent-hole $a'$ is formed through the top to the interior of the cup, this latter vent-hole being for the escape of gases generated within the cup. An insulating-sleeve D, which passes through the hole in the flange $a$, is for the purpose of supporting the zinc element and insulating its stem from the carbon from which the cup is formed. Preferably the flange and the upper end of the carbon cup are impregnated with paraffin, so as to render them practically non-porous. The binding-post $E'$ for the carbon element is secured to the upper end thereof in a suitable manner, and it may be of any suitable construction.

Having described my invention, I claim—

In a voltaic cell, a porous cup having an open lower end, a closed top and an external annular flange at its upper end, all of said parts being integral, and a removable plug which screws into the lower end of said cup and thereby closes the same, and vent-holes in said closed top and said plug, substantially as specified.

In testimony whereof I affix my signature in presence of two witnesses.

CHARLES T. RICHMOND.

Witnesses:
FRANK D. LAWRENCE,
H. E. HACKENBERG.